May 23, 1933. H. E. TAUTZ 1,910,651
TRUNNION TABLE MOUNTING
Filed Dec. 5, 1932    2 Sheets-Sheet 1

WITNESSES
L. E. Kilian
C. L. Naal

INVENTOR
Herbert E. Tautz
By R. S. Caldwell
ATTORNEY

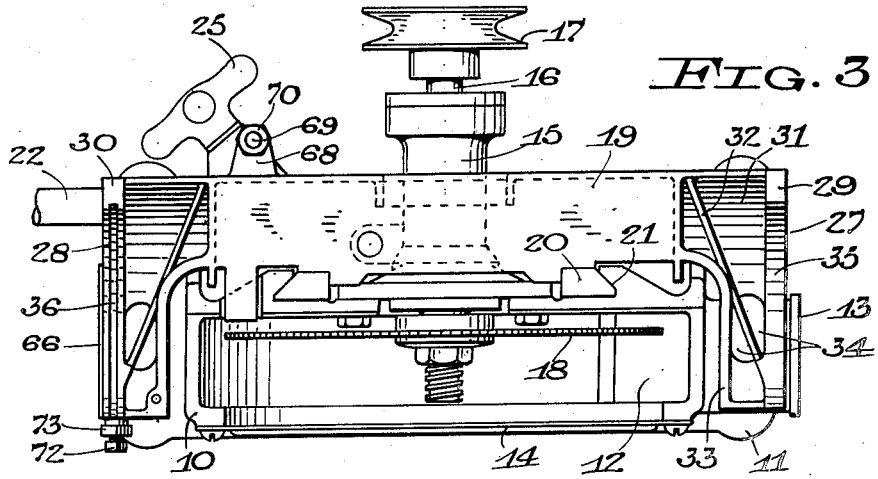

Patented May 23, 1933

1,910,651

UNITED STATES PATENT OFFICE

HERBERT E. TAUTZ, OF MILWAUKEE, WISCONSIN, ASSIGNOR TO THE DELTA MANUFACTURING COMPANY, OF MILWAUKEE, WISCONSIN, A CORPORATION OF WISCONSIN

TRUNNION TABLE MOUNTING

Application filed December 5, 1932. Serial No. 645,640.

The invention relates to mountings for the tiltable tables of circular saws or other machines, and has for an object the provision of durable and rugged trunnion construction for a tiltable table permitting smooth and accurate angular adjustment of the table and insuring rigid locking of the table in adjusted position.

Another object of the invention is to provide a trunnion table mounting which is constructed largely of die-cast metal parts.

A further object of the invention is to provide the table mounting with a clamping member which carries a gear for angularly adjusting the table.

The invention further consists in the several features hereinafter described and claimed.

In the accompanying drawings, Fig. 1 is a side elevation of a tilting saw table with the top in tilted position, parts being broken away and parts being shown in section;

Fig. 3 is a top plan view of the machine with the table removed;

Fig. 4 is a detail sectional elevation of one end of the machine, taken in the plane of the saw, the table being in horizontal position;

Fig. 5 is a detail end view of a table-supporting member;

Fig. 6 is a bottom plan view of one of the trunnions;

Fig. 7 is a detail view of a gear-carrying clamping member; and

Fig. 8 is a perspective view of another clamping member.

Figure 1:
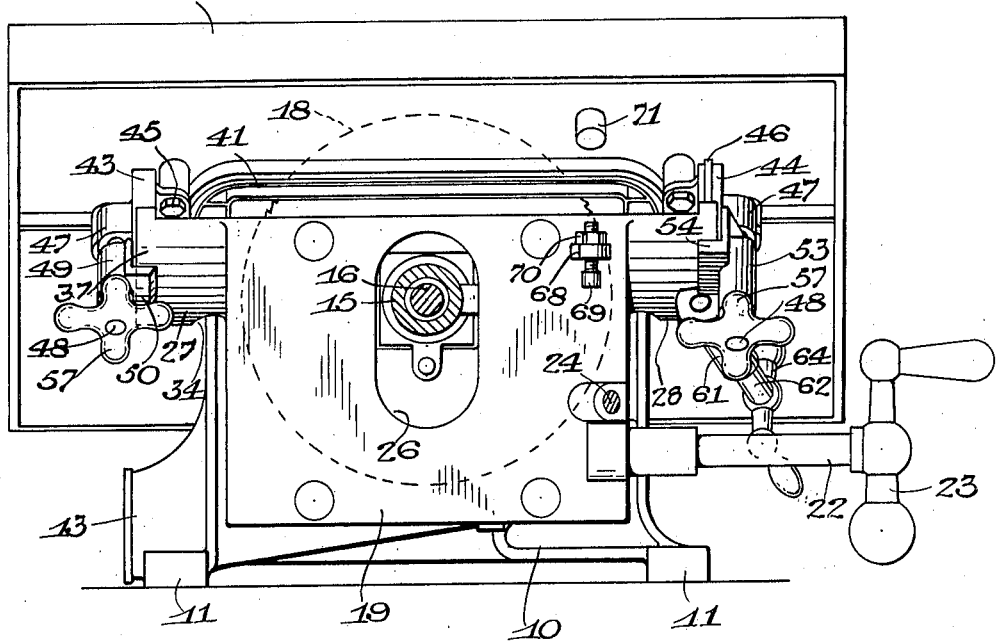
Figure 2:
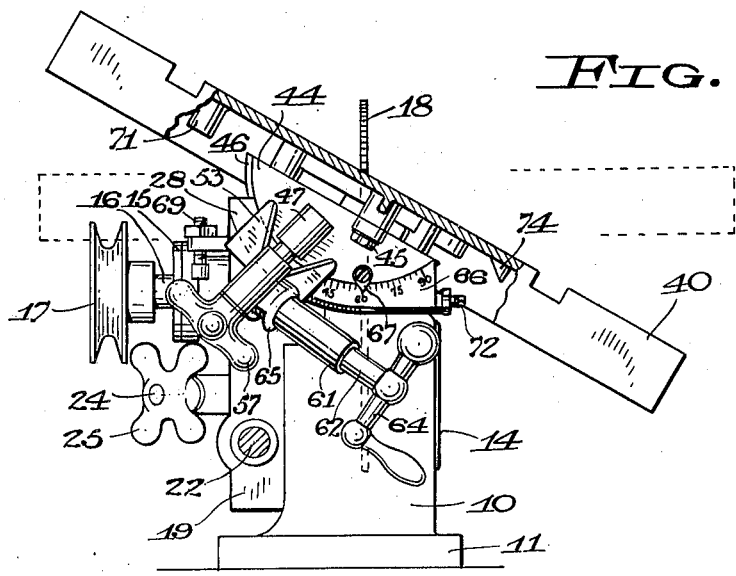
Fig. 2 is an end elevation thereof, partly in section, viewed from the right of Fig. 1.

In these drawings, 10 designates a suitable cast metal standard which is provided with base flanges 11. A saw chamber 12 is formed within the standard 10 and has an outlet 13 at its lower portion. A detachable sheet metal plate 14 closes one side of the chamber 12. A bearing bracket 15 is secured to the standard 10 and has journaled therein a horizontal arbor 16 which is provided with a drive pulley 17 and which carries a circular saw 18 disposed in the chamber 12.

A die-cast table-supporting member 19 is guided for vertical movement on the standard 10 by means of vertical gibs 20 secured to the member 19 and slidably mounted in vertical ways 21 formed in the standard. The vertical adjustment of the table-supporting member 19 is effected by any suitable means, here shown to include an adjustable shaft 22 carrying a crank handle 23, and a locking screw 24 carrying a handwheel nut 25. The arbor bracket 15 passes through a vertical slot 26 formed in the table-supporting member.

The table-supporting member has integrally formed thereon at opposite ends aligned projecting trunnion brackets 27 and 28 having respective arcuate bearing portions 29 and 30. Each of the bearing portions 27 and 28 forms a saddle and is connected to the body of the table-supporting member by an arcuate web 31, a diagonal vertical flange 32, and a curved vertical flange 33. Drain openings 34 are formed in the lowest portion of the web 31. The bearing portion 29 has a plain arcuate upper bearing face 35, and the bearing portion 30 has a grooved arcuate upper bearing face 36. The under side of the bracket 27 has an arcuate clamping face 37, and the under side of the bracket 28 has an arcuate clamping face 38 provided with gear teeth 39.

A saw table 40 is disposed above the table-supporting member 19 and is provided with a detachable soft metal insert plate 41 having therein a longitudinally extending slot 42 for receiving therethrough the circular saw 18. At opposite ends of the insert plate 41, die-cast semi-circular trunnions 43 and 44 are secured by bolts 45 to emboss portions of the table and form supports for the insert plate. The trunnions 43 and 44 have their arcuate portions resting on the arcuate bearing faces 35 and 36, respectively, of the trunnion brackets 27 and 28, the trunnion 44 having a peripheral rib 46 fitting within the groove of the bearing face 36 to prevent shifting of the table in the direction of the pivotal axis. The pivotal axis of the table is disposed substantially in the plane of the upper surface of the table and substantially in the vertical plane of the saw. The arcuate surfaces of the trunnions, the bearing faces 35 and 36, and the clamping faces 37 and 39 are all portions of circular arcs having their centers on the pivotal axis of the table. By this construction, the saw remains centered within the table slot 42 irrespective of the inclination of the table.

Each trunnion at its outer side has an integral lug 47 in which is anchored the upper end of the bolt 48 extending radially of the pivotal axis of the table. At the trunnion-supporting bracket 27, the bolt 48 passes through and has slidably mounted thereon a die-cast clamping member 49 which carries a laterally extending flange 50 provided with a concave seat 51 fitting against the convex clamping face 37 of the bracket. The clamping member 49 has a flat vertical face 52 which is engageable with the outer side wall of the trunnion 43 to prevent rotation of the clamping member about the bolt. At the trunnion-supporting bracket 44 the bolt 48 passes through and has slidably mounted thereon a die-cast clamping member 53 which carries a laterally extending flange 54 provided with a concave seat 55 fitting against the convex clamping surface 38 of the bracket. A flat vertical face 56 on the clamping member engages the outer side wall of the trunnion 44 to prevent rotation of the clamping member about the bolt. Hand-wheel nuts 57 are threaded onto the respective bolts 48 to urge the superposed clamping members 49 and 53 to clamping position against the arcuate clamping faces 37 and 38 of the trunnion-supporting brackets, a washer 58 being interposed between each hand-wheel nut and the superposed clamping member. A coiled spring 59 surrounding each bolt bears against the washer 58 and the bottom of a housing recess 60 in the hand-wheel nut to frictionally retard the rotation of the hand-wheel nut and to maintain the clamping member in frictional engagement with the clamping face when the hand-wheel nut is loosened.

The clamping bracket 53 has integrally formed thereon an angularly extending bearing sleeve 61 in which is journaled a shaft 62 carrying a worm 63 at its inner end and crank handle 64 at its outer end. The worm 63 is disposed within an apertured housing 65 on the clamping bracket and projects therethrough into mesh with the gear teeth 39 on the trunnion bracket 28. The worm 63 may be turned by its shaft when the hand-wheel nuts 57 are loosened, thus causing the table trunnions to turn in their supporting brackets. A degree scale 66 is secured to the outer side wall of the bracket 28 and cooperates with a pointer 67 secured to the outer side wall of the trunnion 44 to indicate the inclination of the table. A lug 68 on the table-supporting member has threaded therein a vertical stop screw 69 held in position by a lock nut 70. A depending embossment 71 on the table is engageable with the stop screw 69 to accurately determine the horizontal position of the table. A horizontal stop screw 72 is threaded into the trunnion bracket 28 and is held in position by a lock nut 73. A lug 74 on the table is engageable with the stop screw 72 to accurately determine the maximum inclination of the table, here indicated to be 45° from the horizontal.

When the angular position of the table is to be changed, the hand-wheel nuts 57 are slightly loosened, and the crank handle 64 is turned to advance the worm 63 along the gear teeth 39, carrying with it the trunnions 43 and 44 which slide on the bearing portions 27 and 28 of the trunnion-supporting brackets. When the desired angular position of the table is reached, the hand-wheel nuts 57 are tightened to firmly lock the table in adjusted position. Although the worm is carried on one of the clamping members, it remains in normal mesh with the gear teeth on the adjacent trunnion saddle and is not relied on for clamping action. The saw blade remains substantially centered in the slot 42 of the insert plate 41 in all positions of the table.

The provision of a die-cast table-supporting member and die-cast trunnions bearing thereon permits accurate fitting of these parts without requiring machining operations.

What I claim as new and desire to secure by Letters Patent is:

1. A trunnion construction comprising a support, a tiltable member having a trunnion rotatably seated on said support, a clamping member carried by said tiltable member and movable with respect thereto for engaging said support and locking said tiltable member in adjusted position, gear teeth carried on said support, and a rotatable gear carried by said clamping member and meshing with said gear teeth for adjusting the angular position of said tiltable member with respect to said support.

2. A trunnion construction comprising a support having a saddle portion presenting a concave bearing face at one side and a convex clamping surface at the other side, a tiltable member having a trunnion rotatably seated on said concave bearing face, a guide stem carried by said tiltable member, a clamping member slidably mounted on said guide stem and having a lateral projection engageable with said clamping surface, and a nut threaded on said guide stem for urging said projection into clamping engagement with said clamping surface.

3. A trunnion construction comprising a support having a saddle portion presenting a concave bearing surface at one side and a convex surface at the other side, said convex surface having gear teeth thereon, a tiltable member having a trunnion rotatably seated on said bearing surface, a clamping member carried by said tiltable member and having a clamping face engageable with said convex surface, and a gear carried by said clamping member and meshing with said gear teeth for adjusting the angular position of said tiltable member with respect to said support.

4. A trunnion construction comprising a support having a saddle portion presenting a concave bearing surface at one side and a convex clamping surface at the other side, a tiltable member having a trunnion rotatably seated on said concave bearing face, there being a lug on said trunnion, a guide stem carried by said lug and extending radially of the trunnion axis, a clamping member having a bore slidably receiving said stem therethrough, said clamping member having a lateral projection engageable with the clamping surface of said saddle portion, and a nut threaded on said stem for urging said projection into clamping engagement with said clamping surface.

5. A trunnion construction comprising a support having gear teeth thereon, a tiltable member having a trunnion rotatably seated on said support, a clamping member carried by said tiltable member and having a clamping face engageable with said support, and a gear rotatably carried by said clamping member and projecting through said clamping face to mesh with said gear teeth.

In testimony whereof I affix my signature.

HERBERT E. TAUTZ.